(12) United States Patent
Nagakura

(10) Patent No.: US 12,188,424 B2
(45) Date of Patent: Jan. 7, 2025

(54) REMOVAL DETERMINATION DEVICE FOR PARTICULATE MATTER TRAPPING DEVICE OF VEHICLE

(71) Applicant: TOYOTA JIDOSHA KABUSHIKI KAISHA, Toyota (JP)

(72) Inventor: Keisuke Nagakura, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/410,160

(22) Filed: Jan. 11, 2024

(65) Prior Publication Data

US 2024/0295197 A1 Sep. 5, 2024

(30) Foreign Application Priority Data

Mar. 3, 2023 (JP) ................................. 2023-032942

(51) Int. Cl.
 F02D 41/14 (2006.01)
 B60R 25/30 (2013.01)
 F01N 3/021 (2006.01)
 F01N 11/00 (2006.01)
 (Continued)

(52) U.S. Cl.
 CPC .......... F02D 41/1446 (2013.01); B60R 25/30 (2013.01); F01N 3/021 (2013.01); F01N 11/002 (2013.01); F02D 37/02 (2013.01); F02D 41/22 (2013.01); F01N 2260/22 (2013.01); F01N 2550/04 (2013.01); F01N 2550/24 (2013.01); F01N 2560/06 (2013.01);
 (Continued)

(58) Field of Classification Search
 CPC ...... F02D 41/1446; F02D 37/02; F02D 41/22; B60R 25/30; F01N 3/021; F01N 11/002; F01N 2260/22; F01N 2550/04; F01N 2550/24; F01N 2560/06; F01N 2590/11; F01N 2900/0422; F01N 2900/1404
 See application file for complete search history.

(56) References Cited

U.S. PATENT DOCUMENTS

2010/0050608 A1* 3/2010 Jayachandran ....... F01N 11/005
 60/286
2011/0143449 A1* 6/2011 Lana ................... G01M 15/102
 422/82.12
2016/0265413 A1 9/2016 Willimowski et al.
 (Continued)

FOREIGN PATENT DOCUMENTS

JP 6283742 B2 2/2018
JP 2019218917 A * 12/2019
JP 2020-112039 A 7/2020

*Primary Examiner* — Audrey B. Walter
(74) *Attorney, Agent, or Firm* — SoraIP, Inc.

(57) ABSTRACT

An exhaust gas control apparatus removal determination device that performs an exhaust gas control apparatus removal determination processing based on a change in temperature of exhaust gas flowing into an exhaust gas control apparatus provided in an exhaust path of an engine and a change in temperature of exhaust gas flowing out. The controller determines whether the first state in which the difference between the measured value and the estimated value of the engine output is greater than or equal to a predetermined value continues for a predetermined time or longer, and determines that the engine output is in the first state. If it is determined, execution of the removal determination processing is prohibited.

4 Claims, 3 Drawing Sheets

(51) Int. Cl.
*F02D 37/02* (2006.01)
*F02D 41/22* (2006.01)

(52) U.S. Cl.
CPC ... *F01N 2590/11* (2013.01); *F01N 2900/0422* (2013.01); *F01N 2900/1404* (2013.01)

(56) References Cited

U.S. PATENT DOCUMENTS

2020/0370490 A1* 11/2020 Katoh ................. F02D 41/1446
2021/0102487 A1* 4/2021 Baumann .............. F01N 13/008

* cited by examiner

REMOVAL DETERMINATION DEVICE FOR PARTICULATE MATTER TRAPPING DEVICE OF VEHICLE

CROSS-REFERENCE TO RELATED APPLICATION

This application claims priority to Japanese Patent Application No. 2023-032942 filed on Mar. 3, 2023, incorporated herein by reference in its entirety.

BACKGROUND

1. Technical Field

The disclosure relates to a device for determining that a device for reducing exhaust gas of an engine has been removed from an exhaust pipe.

2. Description of Related Art

Japanese Unexamined Patent Application Publication No. 2020-112039 (JP 2020-112039 A) discloses a control device for an internal combustion engine, for detecting that an exhaust aftertreatment device is removed from an exhaust pipe. The device in JP 2020-112039 A is equipped with a particulate matter (PM) trapping device having a three-way catalyst as the exhaust aftertreatment device, and determination is made that the PM trapping device is removed based on temperature of exhaust gas flowing into or out of the PM trapping device or differential pressure in exhaust pressure thereof (differential pressure before and after). Specifically, the device of JP 2020-112039 A executes first removal diagnosis in which the PM trapping device is determined to be removed based on difference between a temporal change rate of a first exhaust temperature that is the temperature of the exhaust gas flowing into the PM trapping device and a temporal change rate of a second exhaust temperature that is the temperature of the exhaust gas flowing out of the PM trapping device, and second removal diagnosis in which the current state is determined to be a removed state based on the differential pressure before and after, at an inlet side and an outlet side of the PM trapping device. In the device of JP 2020-112039 A, when an intake air flow rate or an exhaust flow rate is less than a first predetermined flow rate, the first removal diagnosis is performed, and when the intake air flow rate or the exhaust flow rate is no less than the first predetermined flow rate, or a second predetermined flow rate which is greater than the first predetermined flow rate, determination is made by the second removal diagnosis that the PM trapping device is removed.

According to JP 2020-112039 A, as the exhaust flow rate increases, temperature change of exhaust gas passing through the PM trapping device when heat is taken away by the PM trapping device or conversely when heat is received from the PM trapping device becomes small, and accuracy of determining whether the current state is a removed state by the first removal diagnosis decreases. Accordingly, the device disclosed in JP 2020-112039 A is configured to perform the first removal diagnosis under conditions in which the exhaust gas from the internal combustion engine is increasing, as described above. Also, the configuration thereof is such that, in the first removal diagnosis, a difference value between an absolute value of the temporal change rate of the first exhaust temperature and an absolute value of the temporal change rate of the second exhaust temperature is calculated, and when a cumulative value of the difference value over a certain period of time is no lower than a predetermined threshold value, determination is made that the current state is a normal state in which the PM trapping device is not removed.

Japanese Patent No. 6,283,742 discloses a method and a device for monitoring a particle filter in an exhaust gas passage of an internal combustion engine that runs on gasoline. According to the description in Japanese Patent No. 6,283,742, when carbon particles deposited in the particle filter are combusted, a predetermined change (difference) occurs in temperature of exhaust gas. Accordingly, the device of Japanese Patent No. 6,283,742 is configured to monitor temperature change before and after the particle filter, by providing temperature sensors on each of an inlet side and an outlet side of the particle filter. Japanese Patent No. 6,283,742 describes that with such a configuration, determination can be made that the particle filter has been removed when the above-described predetermined change does not occur.

SUMMARY

The device of JP 2020-112039 A utilizes thermal capacity of the PM trapping device to detect removal of the PM trapping device, based on a cumulative value of difference between absolute values of the temperature of the exhaust gas flowing into the PM trapping device and the temperature of the exhaust gas flowing out therefrom. On the other hand, the internal combustion engine may exhibit unstable combustion conditions, such as during startup or the like. In such a case, the flow rate of the exhaust gas flowing into the PM trapping device may decrease or the temperature thereof may become lower, as compared to when the combustion state is stable. Accordingly, when determination is made that the PM trapping device or the particle filter has been removed based on temperature difference of the exhaust gas on an upstream side and a downstream side thereof, as in the device of JP 2020-112039 A and the device of Japanese Patent No. 6,283,742, there is a possibility that an erroneous determination will occur.

Also, the device of JP 2020-112039 A is configured to perform the first removal diagnosis when an intake air amount is less than the first predetermined flow rate. However, even when such conditions are met, when the combustion state of the internal combustion engine is unstable, there is a possibility that changes in the amount and temperature of gas actually discharged from the engine will be different from when the combustion state is stable, which may lead to erroneous determination. Accordingly, with the device disclosed in JP 2020-112039 or Japanese Patent No. 6,283,742, there is a possibility that unintentional removal of the PM trapping device or the particle filter cannot be correctly detected.

The disclosure has been made in light of the above technical problem, and it is an object thereof to provide a removal determination device for an exhaust gas control apparatus, capable of improving the accuracy of determining whether the exhaust gas control apparatus has been removed from the exhaust pipe.

A first aspect of the disclosure is
a removal determination device for an exhaust gas control apparatus that is provided on an exhaust path of an engine installed in a vehicle and that is configured to reduce exhaust gas from the engine, the removal determination device being configured to perform removal determination processing of determining whether the exhaust gas control apparatus is removed from the exhaust path based on a change in temperature of the exhaust gas flowing into the exhaust gas control apparatus and a change in temperature of the exhaust gas flowing out from the exhaust gas control apparatus.

The removal determination device includes a controller for controlling the engine.

The controller is configured to determine that a current state of output of the engine is a first state, in which difference between a measured value of the output of the engine and an estimated value of the output of the engine that is calculated based on a parameter for controlling the engine is no less than a predetermined value is continuing for a predetermined duration time or more, and disable execution of the removal determination processing when the current state of the output of the engine is the first state.

Also, a second aspect of the disclosure is a removal determination device for an exhaust gas control apparatus that is provided on an exhaust path of an engine installed in a vehicle and that is configured to reduce exhaust gas from the engine, the removal determination device being configured to perform removal determination processing of determining whether the exhaust gas control apparatus is removed from the exhaust path based on a change in temperature of the exhaust gas flowing into the exhaust gas control apparatus and a change in temperature of the exhaust gas flowing out from the exhaust gas control apparatus.

The removal determination device includes a controller for controlling the engine.

The controller is configured to determine that a current state of a measured value of torque output by the engine is a second state that is no lower than a torque threshold value set in advance, execute the removal determination processing when the torque of the engine is in the second state, and disable execution of the removal determination processing when the torque of the engine is not in the second state.

Also, in the first aspect of the disclosure, the controller may further be configured to determine that reduction in torque is occurring in the engine due to an external factor including either stoppage of fuel supply or retardation control of ignition timing, and when the reduction in torque is occurring due to the external factor, disable execution of the removal determination processing without executing determination that the engine is in the first state.

Also, in the first aspect of the disclosure, the controller may further be configured to determine that, when the output of the engine is not the first state, the current state of the measured value of torque output by the engine is a second state that is no lower than a torque threshold value set in advance, execute the removal determination processing when the torque of the engine is in the second state, and disable execution of the removal determination processing when the torque of the engine is not in the second state.

Furthermore, in the first aspect of the disclosure, the vehicle may include a motor that is a driving force source, a power split mechanism including a plurality of rotating elements, wherein each of the motor, the engine, and driving wheels is connected to a different rotating element of the rotating elements, and a resolver that detects revolutions of the motor.

The controller may be configured to calculate the measured value of the parameter related to an operating state of the engine based on the revolutions of the motor detected by the resolver.

In the exhaust removal determination device for an exhaust gas control apparatus according to the disclosure, the exhaust gas control apparatus is determined to be removed based on the change in the temperature of the exhaust gas flowing into the exhaust gas control apparatus provided on the exhaust path of the engine and the change in the temperature of the exhaust gas flowing out from the exhaust gas control apparatus. The removal determination device compares the measured engine output and the estimated engine output when executing the removal determination processing. As a result of the comparison, when detection is made that the current state is the first state in which the difference between the measured value and the estimated value of the engine output is no less than a predetermined value set in advance is continuing for a predetermined duration time or more, the removal determination device disables execution of the removal determination processing. When the output of the engine is in such a first state, it is assumed that combustion in the engine is unstable. The removal determination processing is executed based on the temperature of the exhaust gas, and accordingly when the removal determination processing is executed in a state in which the combustion of the engine is unstable, there is a risk that erroneous determination results will be detected in the removal determination. Thus, when it is assumed that the combustion in the engine is unstable, the removal determination device disables execution of the removal determination processing, thereby enabling prevention or suppression such erroneous determination from being made. Further, whether to execute the removal determination processing is determined based on the measured values of output of the engine, and accordingly erroneous determination can be suppressed from being made in the results of the removal determination processing more reliably.

Also, the removal determination device for the exhaust gas control apparatus according to the disclosure is configured to execute the removal determination processing when the measured value of the torque of the engine is no less than a torque threshold value that is set in advance. Accordingly, when the removal determination device determines that the engine is outputting a torque great enough to obtain the exhaust gas necessary for the removal determination processing, due to the measured value of the torque of the engine being no less than the torque threshold value, the removal determination processing is executed. In other words, the removal determination device disables execution of the removal determination processing when determination is made that the torque output by the engine is small. That is to say, when the torque of the engine is small, there is a possibility that the amount or temperature of the exhaust gas is insufficient for the removal determination processing, and accordingly there is a possibility that an erroneous determination will be made in the results of the removal determination processing. Accordingly, when the measured value of the torque of the engine is smaller than the torque threshold value, execution of the removal determination processing is disabled. Thus, such an erroneous determination can be prevented or suppressed from being made in the results of the removal determination processing.

Further, it is sufficient for the removal determination device to be able to execute the removal determination processing even when combustion in the engine is unstable. Thus, the removal determination device is configured such that, even when determination is made that combustion in the engine is unstable, the removal determination processing is executed as long as the measured value of the torque of the engine is no less than the torque threshold value that is set in advance. That is to say, when the removal determination device determines that the engine is outputting a torque great enough to obtain the amount and temperature of exhaust gas necessary for the removal determination processing, due to the measured value of the torque of the engine being no less than the torque threshold value, the removal determination processing is executed. Thus, a situation can be suppressed in which execution of the removal determination processing is disabled even though the removal determination processing can be executed without erroneous determination being made.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
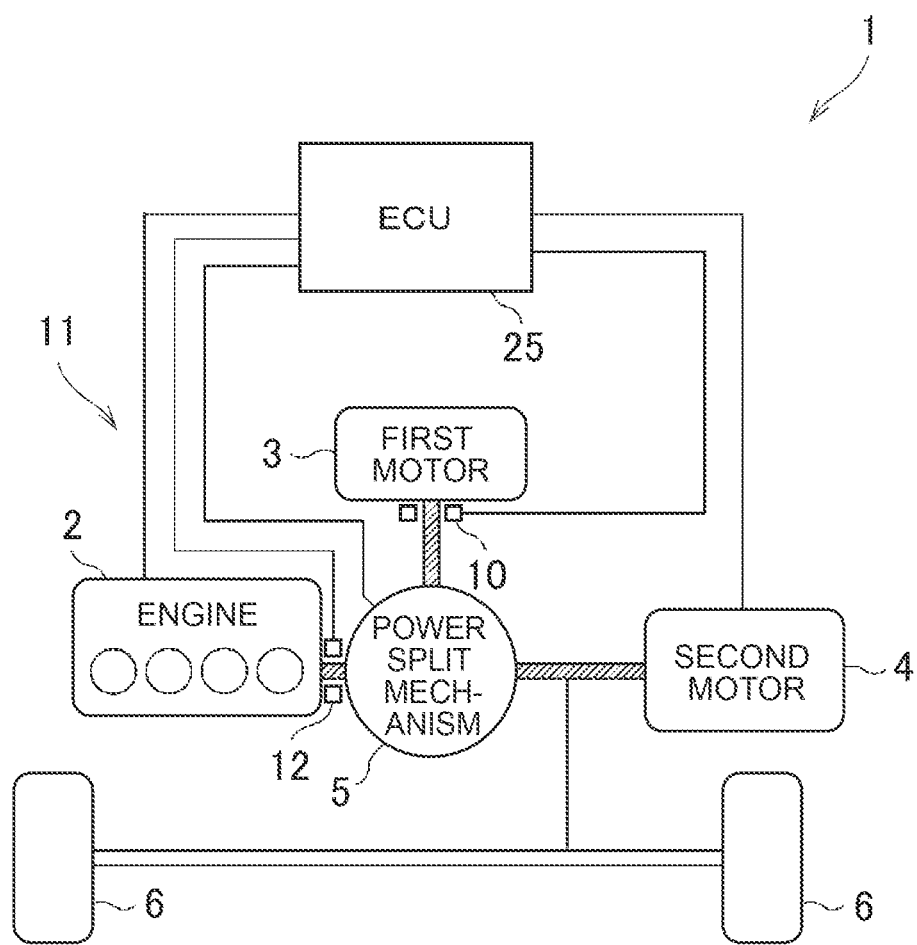
FIG. 1 is a schematic diagram for explaining an example of a vehicle equipped with an exhaust gas control apparatus according to an embodiment of the disclosure.

The disclosure will be described below based on embodiments shown in the drawings. Note that the embodiments described below are merely examples of embodying the disclosure, and are not intended to limit the disclosure.

FIG. 1 schematically shows the overall configuration of a vehicle to which an exhaust gas control apparatus removal determination device according to an embodiment of the disclosure is applied. A vehicle 1 shown in FIG. 1 is an example of a conventionally known hybrid electric vehicle, and is a so-called two-motor type hybrid electric vehicle that includes an engine 2 and two motors 3 and 4 as a driving force source. As shown in FIG. 1, the engine 2 and the first motor 3 are connected to each other via a power split mechanism 5, and the second motor 4 is connected on a power transmission path from the power split mechanism 5 to the driving wheels 6.

Figure 2:
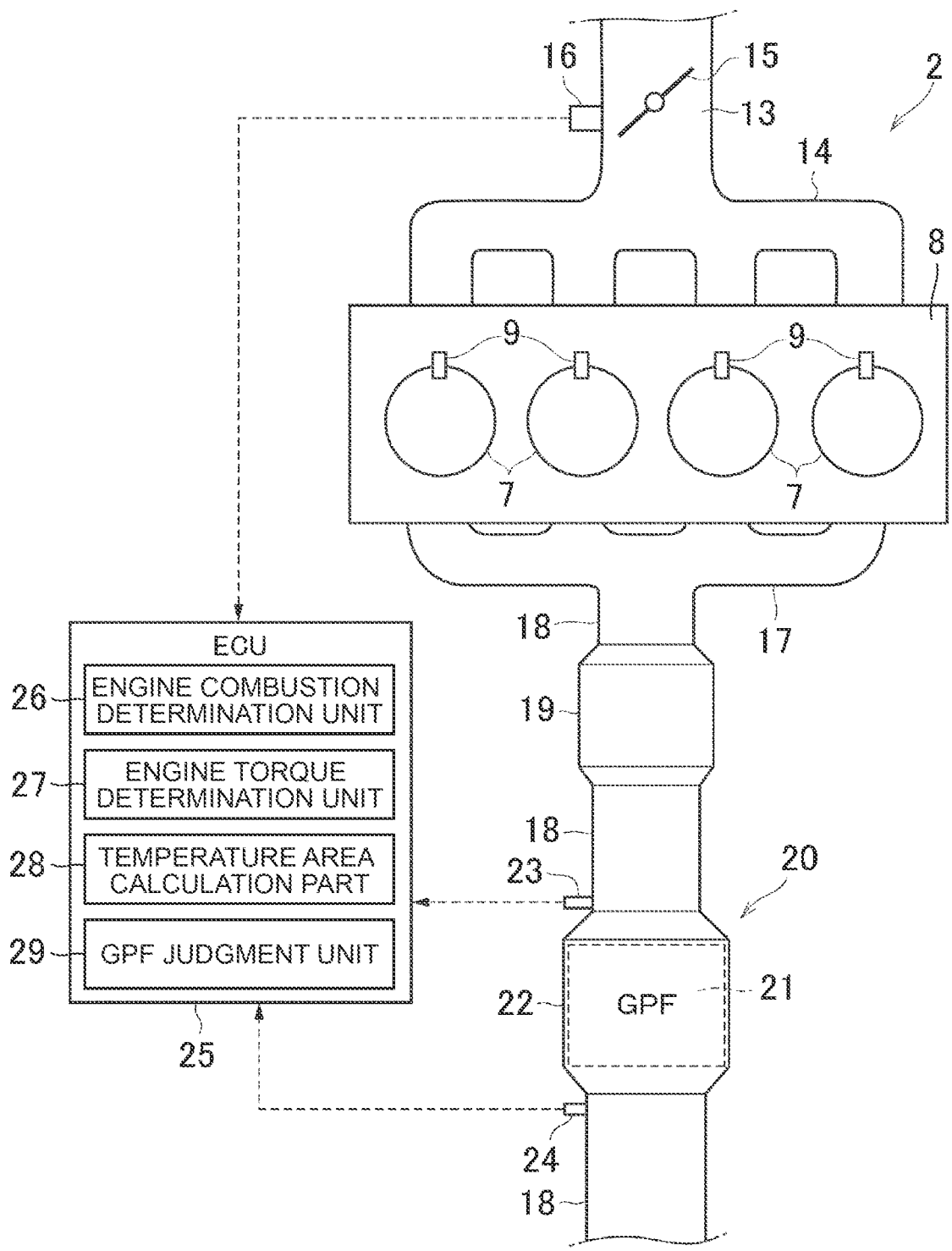
FIG. 2 is a schematic diagram for explaining the engine exhaust system.

Like the conventional engine 2, the engine 2 shown in FIG. 1 is configured to generate power by burning an air-fuel mixture of air and fuel such as gasoline or diesel. As shown in FIG. 2, the engine 2 has a plurality of cylinders 7 for combusting the air-fuel mixture, and the plurality of cylinders 7 are formed in an engine block 8. Each cylinder 7 is provided with a spark plug 9 for igniting the air-fuel mixture.

Each of the motors 3 and 4 has a function as a motor that outputs a driving torque when electric power is applied, similar to a motor as a driving force source provided in a conventional battery electric vehicle or a hybrid electric vehicle. Each of the motors 3 and 4 also has a function as a generator that generates electric power by inputting torque and rotating the motors. That is, each motor 3, 4 is a motor generator. Specifically, it is composed of a permanent magnet type synchronous motor, an induction motor, etc. Each of the motors 3 and 4 is electrically connected to a battery (not shown) or the like, and the electric power generated by the first motor 3 drives the second motor 4, and the torque output by the second motor 4 is It is configured so that it can be added to the driving force for driving the vehicle 1.

The first motor 3 is provided with a resolver 10. The resolver 10 is a sensor that detects the rotation angle (rotation speed) of the first motor 3. The resolver 10 is a conventionally known sensor configured to detect a rotation angle by counting (accumulating) electrical signals generated by changes in reactance between a rotating rotor and a fixed stator.

The power split mechanism 5 is configured by, for example, a single pinion type planetary gear unit. Although not shown in the drawings, the power split mechanism 5 includes a sun gear, a ring gear disposed concentrically with the sun gear, a plurality of pinion gears that mesh with the sun gear and the ring gear, and holds each pinion gear so as to be able to revolve around it. and a carrier that rotatably holds it. An input shaft through which torque is transmitted from the engine 2 is connected to the carrier, a first motor 3 is connected to the sun gear, and a driving wheel 6 and a second motor 4 are connected to the ring gear.

With such a configuration, the vehicle 1 can transmit the torque of the engine 2 to the driving wheels 6 by causing the first motor 3 to output a reaction torque when the engine 2 outputs torque. Therefore, the drive device 11 of the vehicle 1 shown in FIG. 1 is configured to control the rotation speed of the engine 2 by the first motor 3. Specifically, a target output (power) of the engine 2 is calculated based on the required driving force and vehicle speed, and a target engine rotation speed that can realize the output with optimal fuel efficiency is determined. The torque or rotational speed of the first motor 3 is controlled so that the engine rotational speed becomes the target engine rotational speed.

Further, this vehicle 1 is configured to calculate the torque and output of the engine 2 based on the rotation angle of the first motor 3 detected by the resolver 10. For example, the torque of the engine 2 is calculated based on the measured value of the rotation speed of the first motor 3 and the moment of inertia determined by the configuration of the drive device 11 such as the gear ratio of the power split mechanism 5. Further, based on the torque of the engine 2 calculated in this manner and the rotation speed of the engine 2 calculated by the crank angle sensor 12 that detects the angle of the crankshaft (not shown) of the engine 2, output of the engine 2 is calculated. In this way, the actual measured values of the output and torque of the engine 2 are calculated, and their changes over time are obtained.

Next, the configuration of the exhaust path of the engine 2 will be explained with reference to FIG. 2. FIG. 2 shows a device for purifying exhaust gas provided on the exhaust side of the engine 2, and only the parts necessary for explanation are labeled with reference numerals. The intake side of the engine 2 is mainly provided with an intake pipe 13, an intake manifold 14, a throttle valve 15, and a throttle opening sensor 16. Further, on the exhaust side of the engine 2, an exhaust manifold 17, an exhaust pipe 18, a catalyst device 19, and a PM trapping device 20 are mainly provided.

The intake pipe 13 is a pipe for taking in outside air, and is connected to the engine block 8 via an intake manifold 14. In addition to various components such as an air cleaner (not shown), the intake pipe 13 is provided with a throttle valve 15 for controlling the amount of air flowing through the intake pipe 13 based on the amount of accelerator operation by the driver. The intake pipe 13 is provided with a throttle opening sensor 16 for detecting the opening of the throttle valve 15.

The exhaust pipe 18 is a pipe for discharging exhaust air-fuel mixture in each cylinder 7 to the outside of the vehicle, and is connected to the engine block 8 via the exhaust manifold 17.

This exhaust pipe 18 is equipped with various types of equipment for purifying unburned gas (carbon monoxide (CO) and hydrocarbons (HC)) and nitrogen oxides (NOx) contained in the exhaust gas, and for collecting particulate matter. equipment is provided. In the example shown in FIG. 1, the exhaust pipe 18 is provided with a catalyst device 19 such as an oxidation catalyst (two-way catalyst) or three-way catalyst for purifying unburned gas and NOx, and downstream of the catalyst device 19, a PM trapping device 20 that collects particulate matter is provided.

The PM trapping device 20 shown in FIG. 2 is a device that reduces the exhaust gas of the engine 2, and is configured by a so-called wall flow type filter. Specifically, the PM trapping device 20 is a filter called a Gasoline Particulate Filter (GPF) 21, and a three-way catalyst is supported on the filter. Therefore, the PM trapping device 20 can effectively purify unburned gas and NOx contained in the exhaust gas discharged from the catalyst device 19. In the following description, the filter will be simply referred to as GPF 21.

The GPF 21 has an outer diameter that is approximately the same as the inner diameter of the casing formed by expanding the diameter of a part of the exhaust pipe 18, and is assembled inside the casing 22. That is, the casing 22 is provided in communication with the exhaust pipe 18 and is configured so that all of the exhaust gas that has flowed to the casing 22 passes through the inside of the GPF 21.

An input temperature sensor 23 is provided between the catalyst device 19 and the GPF 21 in the exhaust pipe 18 to detect the temperature of the exhaust gas flowing into the GPF 21. Further, in order to detect the temperature of the exhaust gas flowing out from the GPF 21, an output temperature sensor 24 is provided on the downstream side of the GPF 21.

The vehicle 1 is provided with an electronic control unit (hereinafter referred to as ECU) 25 that controls the engine 2 and the motors 3 and 4 configured as described above. This ECU 25 is mainly composed of a microcomputer, similar to the ECU installed in the conventional vehicle 1, and receives signals from various sensors installed in the vehicle 1, and compares the input signals with the input signals in advance. It is configured to output results obtained based on stored maps, calculation formulas, etc. to the engine 2, each motor 3, 4, etc. as a control command signal. The signals input to the ECU 25 include data regarding the rotational speed of the first motor 3 detected by the resolver 10, the temperature measured by the input temperature sensor 23 and the output temperature sensor 24, and the like. The ECU 25 also includes an engine combustion determination unit 26, an engine torque determination unit 27, a temperature area calculation unit 28, and a GPF determination unit 29.

The engine combustion determination unit 26 determines that combustion in the engine 2 is stable. Specifically, the engine combustion determination unit 26 compares the measured value of the output of the engine 2 calculated as described above with the estimated value of the output of the engine 2 determined from the fuel injection amount and the intake air amount. If the difference between the measured value and the estimated output of the engine 2 continues to be a predetermined value or more for a predetermined time or more, the engine combustion determination unit 26 determines that the combustion of the engine 2 is stopped. It is judged to be unstable.

The engine torque determination unit 27 determines that the measured value of the torque of the engine 2 is equal to or greater than a predetermined torque threshold. The torque threshold here is a value that allows it to be determined that the exhaust gas from the engine 2 is in a state where the removal determination processing can be executed. That is, the engine torque determination unit 27 determines that the temperature and amount of exhaust gas estimated from the actually measured torque of the engine 2 are sufficient for executing the removal determination processing.

The temperature area calculation unit 28 calculates an integrated value of the temperature of the exhaust gas flowing into the GPF 21 and an integrated value of the temperature of the exhaust gas flowing from the GPF 21. The temperature area calculation unit 28 acquires changes over time in each temperature detected by the input temperature sensor 23 and the output temperature sensor 24. The temperature area calculation unit 28 calculates the time required until the temperature of the exhaust gas flowing out from the GPF 21 reaches a predetermined temperature. The temperature area calculation unit 28 integrates the difference between the initial temperature of the input temperature sensor 23 and the changed temperature until the required time is reached, and also calculates the difference between the initial temperature of the output temperature sensor 24 and the changed temperature. and calculate their temperature area.

The GPF determination unit 29 determines that the GPF 21 is removed based on the temperature area calculated by the temperature area calculation unit 28. The GPF determination unit 29 calculates the ratio of the temperature area based on the temperature of the exhaust gas flowing into the GPF 21 to the calculated temperature area based on the temperature of the exhaust gas flowing out from the GPF 21. If the calculated temperature area ratio is smaller than a predetermined area ratio, it is determined that the GPF 21 has been removed; on the other hand, if the calculated temperature area ratio is greater than or equal to the predetermined area ratio, the GPF 21 is determined to have been removed. It is determined that the Because the heat capacity of GPF 21 is relatively large, the temperature of output temperature sensor 24 starts to rise relatively early when GPF 21 is removed. The GPF determination unit 29 compares the temperature area ratio with a predetermined area ratio, detects a change in the temperature area ratio, and determines that the GPF 21 has been removed. Note that the removal determination processing is executed in a state where the temperature of the catalyst is low.

Figure 3:
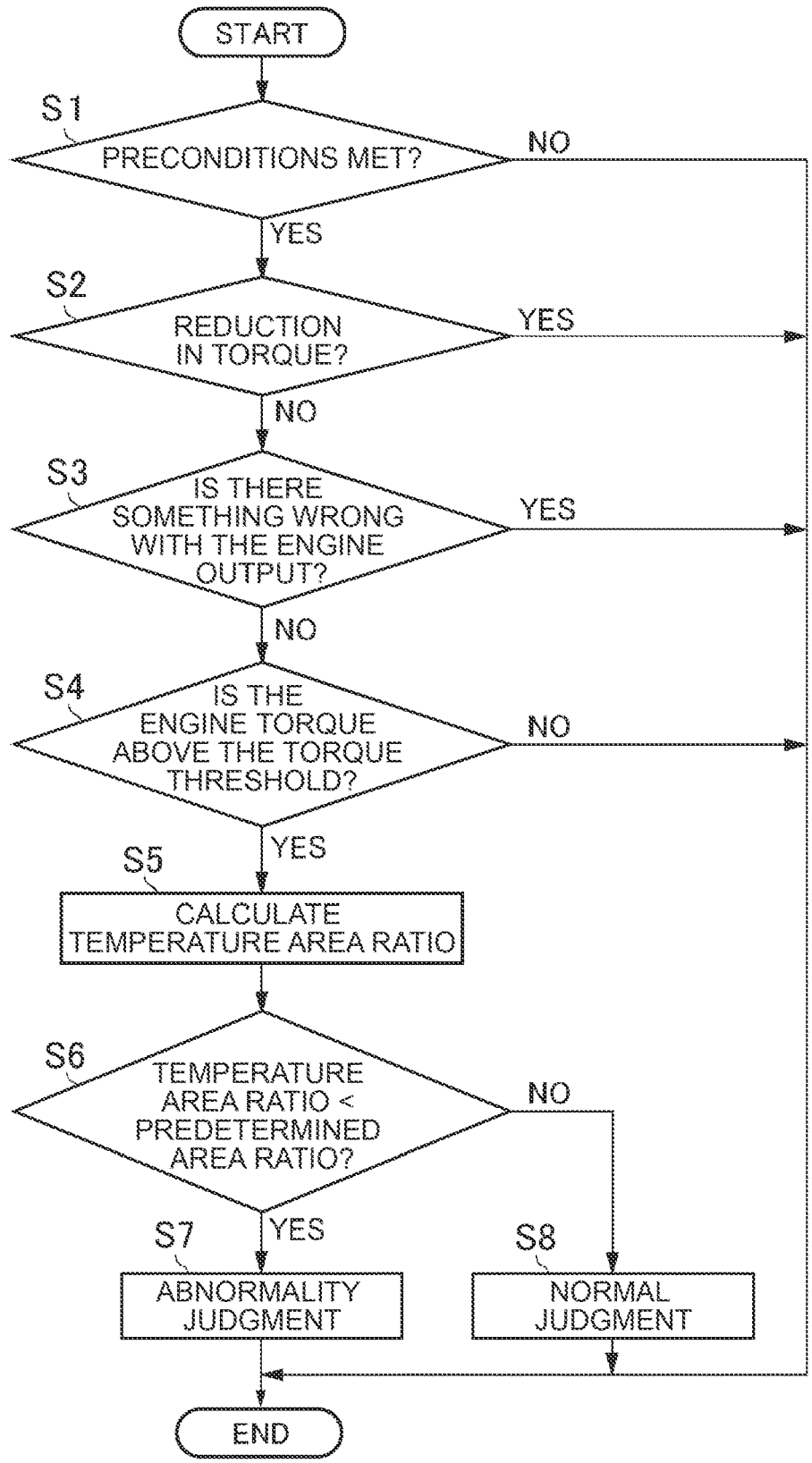
FIG. 3 is a flowchart for explaining an example of control executed by the removal determination device according to the embodiment of the disclosure.

FIG. 3 shows a flowchart for explaining an example of control executed by the ECU 25. In the flowchart shown in FIG. 3, it is determined that, when the vehicle 1 is able to travel, the PM trapping device 20 provided on the exhaust path of the engine 2, that is, the GPF 21, is removed depending on the combustion state of the engine 2. In S1, it is determined that preconditions for executing the removal determination processing are satisfied. In S1, it is mainly determined whether the removal determination processing needs to be executed or whether the removal determination processing is possible.

For example, it is determined that the GPF 21 removal determination processing has been executed during the current run of the vehicle 1. Note that the current traveling period refers to, for example, the period from when the ignition switch of the vehicle 1 was turned on to the present time. If the removal determination has already been performed, it is determined that the preconditions are not satisfied, and a negative determination is made in S1. Further, it is determined whether the sensors necessary for calculating the parameters used to execute the removal determination processing are malfunctioning. For example, it is determined that the input temperature sensor 23, the output temperature sensor 24, the resolver 10, etc. described above are correctly detecting each parameter. If these detectors cannot correctly detect the parameters, it is determined that the preconditions are not satisfied, and a negative determination is made in S1. If a negative determination is made in S1, the routine shown in this flowchart is temporarily terminated without executing subsequent control.

On the other hand, if the precondition is satisfied in S1 and the determination is affirmative, the process proceeds to S2, where reduction in torque of the engine 2 is determined. In S2, it is determined that the torque output by the engine 2 is decreasing due to an external factor. The external factors mentioned here are, for example, changes in the combustion state that are not caused by the driver's operations, such as stopping the supply of fuel without the driver's accelerator pedal operation, or retardation control of the ignition timing in a gasoline engine. It is a factor or event. When reduction in torque occurs due to such external factors, as time passes, the temperature and amount of exhaust gas necessary to execute the removal determination processing to determine that the GPF has been removed may become insufficient. In other words, an erroneous determination may occur when the removal determination processing is executed. In order to suppress the occurrence of such erroneous determinations, if a reduction in torque has occurred in the engine 2 due to an external factor, a YES determination is made in S2, and subsequent control is not executed in this flowchart. The indicated routine is temporarily terminated.

If the determination in S2 is NO because no reduction in torque has occurred in the engine 2 due to an external factor, the process proceeds to S3, and a determination of a decrease in the output of the engine 2 is performed. In S3, it is determined that the difference between the estimated value of the estimated output of the engine 2 and the actual measured value of the actually measured output of the engine 2 is greater than or equal to a predetermined value, and the state in which the difference is greater than or equal to the predetermined value is continuing for a predetermined period of time or more. The estimated value of the output of the engine 2 can be estimated based on parameters for controlling the engine 2, characteristics of the engine 2, and the like.

For example, when the driver depresses the accelerator pedal, the target engine torque (instruction torque) is determined according to the depressing angle and the depressing force. The engine 2 is controlled by the ECU 25 to control the fuel injection amount, intake air amount, ignition timing, etc. so that the output torque gradually increases to the target engine torque. At that time, the torque output by the engine 2 is estimated based on control parameters such as the fuel injection amount, intake air amount, and ignition timing of the engine 2 controlled by the ECU 25, and the characteristics of the engine 2. be able to. By multiplying the estimated torque of the engine 2 by the rotational speed of the engine 2 detected by the crank angle sensor 12 of the engine 2, an estimated value of the output of the engine 2 can be calculated.

Further, the actual measured value of the output of the engine 2 is calculated using the detection result of the resolver 10 as described above. Specifically, the measured output of the engine 2 is determined by first determining the angular acceleration of the motor from the angular velocity of the motor detected by the resolver 10, and then calculating the moment of inertia determined by the configuration (specifications) of the drive device 11 such as the shaft and gear. By multiplying the calculated angular acceleration, the actual measured value of the torque of the engine 2 can be calculated. The measured output of the engine 2 can be calculated by multiplying the calculated measured engine torque by the rotational speed of the engine 2 determined from the value detected by the crank angle sensor 12 of the engine 2.

The predetermined value and predetermined time in S3 may be set to include an error range determined from the influence of the environment such as temperature, the characteristics of the engine 2, the configuration of the drive device 11, etc., for example. That is, the predetermined value and the predetermined time may be values that allow it to be determined that combustion in the engine 2 is stable, and can be determined in advance based on the results of experiments, simulations, etc. If the difference between the estimated output and the actual measured output of the engine 2 continues for a predetermined time or more, the determination is YES in S3, and the subsequent control is not executed as shown in this flowchart. End the routine once. Note that the output of engine 2 may change temporarily due to the operation of engine 2 being affected by various factors such as when starting, so in S3, even if the difference is greater than a predetermined value, the output may change temporarily. If there is no abnormality, it is determined that there is no abnormality in the output of the engine 2. Further, the output of the engine 2 in the embodiment of the disclosure is in the first state if the difference between the estimated output and the measured output of the engine 2 continues for a predetermined value or more for a predetermined time or more. It corresponds to that.

On the other hand, if the determination in S3 is NO because there is no abnormality in the output of the engine 2, and the process proceeds to S4, it is determined that the actual measured value of the output torque of the engine 2 is greater than or equal to the torque threshold value. In S4, it is determined that the engine 2 is outputting the torque necessary to execute the GPF 21 removal determination processing. In other words, in S4, although the combustion state of the engine 2 is stable in S3, the exhaust gas temperature is high or the amount of exhaust gas is sufficiently obtained, so that the engine torque is applied to an extent that does not reduce the accuracy of the removal determination processing. It is determined whether or not 2 is outputting. Therefore, the torque threshold value is set to the lower limit value of the engine torque necessary to execute the removal determination processing, and is set, for example, to a torque slightly larger than the torque for the engine 2 to rotate independently.

If the actual measured value of the torque of the engine 2 calculated as described above is smaller than the torque threshold value, and the determination is NO in S4, the routine shown in this flowchart is temporarily executed without executing the subsequent control. finish. In other words, even if the combustion of engine 2 is stable, the output torque of engine 2 is small, so even if the above-mentioned removal determination processing is executed, it may not be possible to make an accurate determination. Prohibits execution of removal determination processing. Note that the fact that the measured value of the torque of the engine 2 is equal to or greater than a predetermined torque threshold corresponds to the fact that the torque of the engine 2 is in the second state in the embodiment of the disclosure.

If the actual measured value of the torque of the engine 2 is equal to or greater than the torque threshold value, and the determination is YES in S4, the process proceeds to S5, and the GPF 21 removal determination processing is executed. The GPF 21 removal determination processing is a conventionally known process, and is performed by comparing the integrated value of the temperature of the exhaust gas flowing into the GPF 21 and the temperature of the exhaust gas flowing out from the GPF 21.

In S5, the time from when the temperature of the exhaust gas flowing out from the GPF 21 detected by the output temperature sensor 24 reaches a predetermined temperature after the engine 2 is started is detected. Changes in the temperature of the exhaust gas flowing into the GPF 21 and the temperature of the exhaust gas flowing out from the GPF 21 detected by the input temperature sensor 23 and the output temperature sensor 24 during the required time from the start of the engine 2 to the detected arrival time. To detect. Note that the temperature change here is the difference from the initial temperature of each temperature sensor. Based on the detected temperature change over time, calculate the integrated value of the temperature change of each exhaust gas up to the above-mentioned required time, and calculate the temperature area of each of the exhaust gas flowing into the GPF 21 and the exhaust gas flowing out from the GPF 21. Then, in S5, the ratio of the temperature area of the exhaust gas flowing into the GPF 21 to the temperature area of the exhaust gas flowing out from the GPF 21 is calculated, and the process proceeds to S6.

In S6, it is determined that the temperature area ratio calculated in S5 is smaller than a predetermined area ratio. The temperature of the exhaust gas flowing out from the GPF 21 has decreased by an amount corresponding to the heat capacity of the GPF 21. Therefore, the temperature area ratio changes depending on the heat capacity of the GPF 21 between the state in which the GPF 21 is attached and the state in which it is removed. For example, when the GPF 21 is removed, the temperature of the exhaust gas flowing out from the GPF 21 starts to rise earlier than when the GPF 21 is installed. On the other hand, the temperature of the exhaust gas flowing into the GPF 21 is less affected by the GPF 21 being removed. In addition, since the temperature of the exhaust gas flowing into the GPF 21 rises first, the temperature area based on the temperature of the exhaust gas flowing into the GPF 21 decreases more than the temperature area based on the temperature of the exhaust gas flowing out from the GPF 21. Become. Therefore, when the above-mentioned temperature area ratio is calculated, the temperature area ratio when the GPF 21 is removed is smaller than the temperature area ratio when the GPF 21 is attached. Such a difference in temperature area ratio is noticeable because the heat capacity of the GPF 21 is relatively large. Therefore, the predetermined area ratio is set in advance to a ratio that makes it possible to detect a difference in the temperature area ratio based on the results of experiments, simulations, and the like.

If the calculated temperature area ratio is smaller than the predetermined area ratio, and the determination is YES in S6, the process proceeds to S7, and it is determined that the GPF 21 has been removed. When proceeding to S7, since the temperature area ratio is smaller than the predetermined area ratio, it is assumed that the temperature of the exhaust gas flowing out from the GPF 21 has started to rise early. Therefore, it is determined that the GPF 21 has been removed, and the routine shown in this flowchart is temporarily terminated.

On the other hand, if the temperature area ratio is equal to or greater than the predetermined area ratio and the determination is NO in S6, the process proceeds to S8 and it is determined that the GPF 21 has not been removed. When proceeding to S8, since the temperature area ratio is equal to or higher than the predetermined area ratio, it is assumed that the temperature of the exhaust gas flowing out from the GPF 21 has started to rise with a delay corresponding to the heat capacity of the GPF 21. Therefore, it is determined that the GPF 21 has not been removed, and the routine shown in this flowchart is temporarily terminated.

According to the GPF 21 removal determination device in the embodiment of the disclosure, it is determined that combustion of the engine 2 is stable based on the estimated output of the engine 2 and the measured output of the engine 2. Based on the determination, if it is determined that the engine 2 is burning stably, the GPF 21 removal determination processing is executed.

The removal determination processing of the GPF 21 is performed based on the temperature of the exhaust gas flowing into the GPF 21 and the temperature of the exhaust gas flowing out from the GPF 21. Therefore, when combustion in the engine 2 is unstable, for example, the temperature of the exhaust gas detected by the input temperature sensor 23 becomes low due to a small amount of exhaust gas, or due to the influence of components contained in the exhaust gas. There is a possibility that the temperature of the exhaust gas flowing out from the GPF 21 becomes high. In such a case, the temperature area ratio obtained based on each exhaust gas may be affected, and as a result, there is a risk of causing an erroneous determination in the removal determination processing. In the embodiment described above, when it is detected that combustion in the engine 2 is unstable, execution of the removal determination processing is prohibited to prevent or suppress such a false determination from occurring. can. Moreover, since it is determined whether to execute the removal determination processing based on the actual measured values of the output and torque of the engine 2, it is possible to more reliably suppress the occurrence of erroneous determination as a result of the removal determination processing.

Further, the removal determination device according to the embodiment of the disclosure is configured to execute a removal determination processing when the output torque of the engine 2 is equal to or higher than a torque threshold value. Therefore, the removal determination device determines that the engine 2 is outputting a torque large enough to obtain the exhaust gas necessary for the removal determination processing, based on the fact that the measured value of the torque of the engine 2 is greater than or equal to the torque threshold value. If so, a removal determination processing is executed. In other words, in the removal determination device, even if the combustion state of the engine 2 is stable, if it is determined that the torque output by the engine 2 is small, the amount of exhaust gas required for the removal determination processing is determined. Since there is a possibility that the temperature is not reached, execution of the removal determination processing is prohibited. Therefore, it is possible to prevent or suppress the occurrence of an erroneous determination in such a removal determination.

Although the embodiments of the disclosure have been described above, the disclosure is not limited to the above-described examples, and may be modified as appropriate within the scope of achieving the object of the disclosure. For example, in the above-described flowchart, it may be determined whether to perform the removal determination processing only by determining that the measured value of the engine torque is greater than or equal to the torque threshold value. That is, it may be configured to determine whether to perform the removal determination processing based on only one of the determinations in S3 and S4. Furthermore, the determination is not limited to the output of the engine 2, but may be determined based on other parameters as long as it is possible to determine that the combustion of the engine 2 is stable. For example, the removal determination device may be configured to determine the combustion state of the engine 2 based on the torque of the engine 2 instead of determining the combustion state based on the output of the engine 2.

In that case, similar to the process in S3, the difference between the estimated torque value of engine 2 and the actual measured torque value of engine 2 is compared, and it is predetermined that the difference is greater than or equal to a predetermined torque difference. It is determined that the process continues for a certain period of time or more. These predetermined torque differences and fixed times may be set within an error range determined by, for example, the influence of the environment such as temperature, the characteristics of the engine 2, the configuration of the drive device 11, and the like. In other words, the value may be any value that allows it to be determined that combustion in the engine 2 is unstable, and can be determined in advance based on the results of experiments, simulations, etc. If the difference between the estimated torque value of engine 2 and the actual engine torque value is greater than or equal to the torque difference mentioned above for a certain period of time or more, the determination is YES and execution of the removal determination processing is prohibited. Otherwise, proceed to S4 described above. On the other hand, if the torque of the engine 2 is not in such a state, the determination may be NO and the removal determination processing may be executed or the process may proceed to S5 described above. Note that the process of determining the combustion state of the engine 2 based on the torque of the engine 2 is configured to be executed before the process of S3 is executed or after the process of S3 is executed. Good too.

Furthermore, the removal determination device may be configured to execute the process in S4 when the determination in S3 is YES. That is, when the removal determination device determines YES in S3 due to an abnormality in the output of the engine 2, it executes S4 in which it is determined that the actual measured value of the output torque of the engine 2 is equal to or higher than the torque threshold value. It may be configured as follows. In that case, if the measured value of the torque of the engine 2 is smaller than the torque threshold value, a NO determination is made in S4, and the routine shown in the flowchart is temporarily terminated without executing the removal determination processing. good. In other words, since the combustion of engine 2 is unstable and the output torque of engine 2 is small, even if the above-mentioned removal determination processing is executed, there is a possibility that it will not be possible to make an accurate determination. Prohibits execution of removal determination processing. On the other hand, if the measured value of the torque of the engine 2 is abnormal to the torque threshold value, YES is determined in S4, the process proceeds to S5, and the removal determination processing may be executed.

That is, even if the combustion of the engine 2 is unstable, it is sufficient if the removal determination processing can be executed. Therefore, in S4 in such a configuration, although the combustion state of the engine 2 has deteriorated in S2 and S3, the accuracy of the removal determination processing is low, such as because the temperature of the exhaust gas is high or a sufficient amount of exhaust gas is obtained. It is determined whether the engine 2 is outputting a torque that does not decrease. Therefore, if it is determined that the engine 2 is outputting a torque large enough to obtain the exhaust gas necessary for the removal determination processing because the measured engine torque of the engine 2 is greater than or equal to the torque threshold, the removal determination processing is executed. Therefore, it is possible to prevent or suppress a situation in which execution of the removal determination processing is prohibited even though the result of the removal determination processing can be correctly determined.

What is claimed is:

1. A removal determination device for a particulate matter trapping device of a vehicle that includes an engine, the particulate matter trapping device being provided on an exhaust path of the engine, the exhaust path including a casing that is able to accommodate the particulate matter trapping device, the removal determination device comprising:
  a processor for controlling the engine, the processor configured to control the engine by control parameter including at least one of fuel injection amount, intake air amount and ignition timing;
  a first temperature sensor provided upstream of the casing and configured to detect a first temperature of exhaust gas;
  a second temperature sensor provided downstream of the casing and configured to detect a second temperature of the exhaust gas; and
  a crank angle sensor configured to detect an angle of a crankshaft of the engine, wherein
  the processor is configured to;
  receive the angle of the crankshaft from the crank angle sensor, calculate a rotational speed of the engine, and convert the rotational speed of the engine to an output of the engine as a measured engine output,
  estimate an output of the engine based on the control parameter as an estimated engine output,
  determine whether a current state of output of the engine is in a first state, in which a difference between the measured engine output and the estimated engine output is no less than a predetermined value is continuing for a predetermined duration time or more, and
  execute a removal determination processing when the current state of the output of the engine is not in the first state, and prohibit execution of the removal determination processing when the current state of the output of the engine is in the first state, wherein
  in the removal determination processing, the processor is configured to,
    receive a first temperature data from the first temperature sensor and convert the first temperature data to a first integrated value of temperature change in the first temperature sensor during a predetermined period,
    receive a second temperature data from the second temperature sensor and convert the second temperature data to a second integrated value of temperature change in the second temperature sensor during the predetermined period, and
    determine that the particulate matter trapping device is removed from the casing, when a ratio of the first integrated value to the second integrated value is smaller than a predetermined value.

2. The removal determination device according to claim 1, wherein the processor is further configured to
determine whether, when the output of the engine is not in the first state, the current state of a torque of the engine is in a second state that is no lower than a torque threshold value set in advance,
execute the removal determination processing when the torque of the engine is in the second state, and
prohibit execution of the removal determination processing when the torque of the engine is not in the second state.

3. The removal determination device according to claim 1, wherein:
the vehicle further includes
a motor that is a driving force source,
a power split mechanism including a plurality of rotating elements, wherein each of the motor, the engine, and driving wheels is connected to a different rotating element of the rotating elements, and
a resolver that detects a rotational angle of the motor; and
the processor is configured to
receive the rotational angle of the motor detected by the resolver and convert to an engine toque, and
convert the rotational speed of the engine to the output of the engine as the measured engine output, based on the engine toque.

4. A removal determination device for a particulate matter trapping device of a vehicle,
the vehicle including;
an engine,
an exhaust path of the engine, including a casing that is able to accommodate the particulate matter trapping device,
a motor that is a driving force source, and
a power split mechanism including a plurality of rotating elements, wherein each of the motor, the engine, and driving wheels is connected to a different rotating element of the rotating elements,
the removal determination device comprising:
a processor for controlling the engine, the processor configured to control the engine by control parameter including at least one of fuel injection amount, intake air amount and ignition timing;
a first temperature sensor provided upstream of the casing and configured to detect a first temperature of exhaust gas;
a second temperature sensor provided downstream of the casing and configured to detect a second temperature of the exhaust gas; and
a resolver that detects a rotational angle of the motor, wherein
the processor is configured to;
receive the rotational angle of the motor detected by the resolver and convert the rotational angle of the motor to an engine torque,
determine whether a current state of the engine torque is in a second state that is no lower than a torque threshold value set in advance,
execute a removal determination processing when the engine torque is in the second state, and
prohibit execution of the removal determination processing when the engine torque is not in the second state, wherein
in the removal determination processing, the processor is configured to,
receive a first temperature data from the first temperature sensor and convert the first temperature data to a first integrated value of temperature change in the first temperature sensor during a predetermined period,
receive a second temperature data from the second temperature sensor and convert the second temperature data to a second integrated value of temperature change in the second temperature sensor during the predetermined period, and
determine that the particulate matter trapping device is removed from the casing, when a ratio of the first integrated value to the second integrated value is smaller than a predetermined value.

* * * * *